United States Patent [19]

Farrell

[11] Patent Number: 4,798,560
[45] Date of Patent: Jan. 17, 1989

[54] UNITIZED WHEEL BEARING ASSEMBLY

[75] Inventor: Robert C. Farrell, Frankenmuth, Mich.

[73] Assignee: General Motors Corporation, Detroit, Mich.

[21] Appl. No.: 702,919

[22] Filed: Feb. 19, 1985

[51] Int. Cl.$^4$ .................... F16C 33/00; F16D 3/23
[52] U.S. Cl. ........................ 464/178; 29/525.1; 180/259; 384/544
[58] Field of Search ............. 29/505, 522 R, 526; 180/254, 259; 280/96.1; 384/517, 544, 563; 403/261, 326, 375; 411/352, 353, 360, 517; 464/178

[56] References Cited

U.S. PATENT DOCUMENTS

| | | |
|---|---|---|
| 3,290,077 | 12/1966 | La Barge .................... 29/505 X |
| 3,804,562 | 4/1974 | Hansson ..................... 384/517 X |
| 3,923,408 | 12/1975 | Belsdorf ..................... 411/517 X |
| 4,364,615 | 12/1982 | Euler ............................. 384/517 |
| 4,424,047 | 1/1984 | Welschof et al. ........... 464/178 X |
| 4,433,932 | 2/1984 | Brandenstein et al. ........ 403/261 |
| 4,449,841 | 5/1984 | Brandenstein et al. ...... 403/375 X |
| 4,573,809 | 3/1986 | Jacob ........................... 384/517 X |

Primary Examiner—Daniel P. Stodola
Attorney, Agent, or Firm—F. J. Fodale

[57] ABSTRACT

A wheel bearing assembly comprises a wheel hub, a bearing assembly and a retainer for retaining the inner ring of the bearing assembly on the wheel hub. The retainer includes a retaining ring and a load ring which is plastically deformed radially inwardly so that the inner ring of the bearing assembly is biased against an annular shoulder of the wheel hub under a substantial axial preload.

2 Claims, 1 Drawing Sheet

UNITIZED WHEEL BEARING ASSEMBLY

This invention relates generally to wheel bearing assemblies and more particularly to unitized wheel bearing assemblies for motor vehicles which include a wheel hub and an outer drive member of a constant velocity universal joint which is formed as an integral part of the wheel hub.

It is already known from U.S. Pat. No. 4,424,047 granted to Hans-Heinrich Welschof and Rudolf Beier on Jan. 3, 1984 and from U.S. Pat. No. 4,449,841 granted to Manfred Brandenstein and Rudiger Hans on May 22, 1984 that the inner ring members of a double row ball bearing can be mounted on the wheel hub-outer drive member and retained thereon by a retaining ring which is plastically deformed to seat in a V-shaped groove of the wheel hub-outer drive member and apply an axial preloading force to the inner ring members.

The retaining means disclosed in the earlier U.S. Pat. No. 4,424,047 has difficulty in applying and maintaining a high axial preloading force because of the small contact surface between the face of bearing inner ring and the edge of the plastically deformed retaining ring.

The later U.S. Pat. No. 4,449,841 purportedly solves the problem by use of a retaining ring which is of L-shaped cross section so that an independent axial preload force can be applied while a radial deformation force is applied to plastically deform the axially extending leg into the V-shaped groove of the wheel hub-outer drive member.

This solution, however, introduces the complexity of simultaneously applying independent axial and radial forces to the retaining ring.

Moreover, the solution fails to deal with another difficulty of the earlier patent which is that the magnitude of the axial preload force which is produced is very sensitive to the stack-up tolerances of the manufactured parts in the axial direction. In other words, the wheel hub-outer drive member, the ball bearing and the retaining ring must be made within very close tolerances to provide any accurate axial preload of substantial magnitude.

The object of my invention is to provide a new and improved means and method of retaining a bearing inner ring member on a wheel hub-outer drive member so that a substantial axial preload is always applied to the inner ring member.

Another object of my invention is to provide a unitized wheel bearing assembly in which a bearing inner ring member is retained on the wheel hub-outer drive member by a retaining means which applies a substantial axial preload to the inner race member so as to counteract wheel loading particularly during cornering maneuvers of the vehicle.

Another object of my invention is to provide a unitized wheel bearing assembly in which a bearing inner ring member is retained on a wheel-hub outer drive member under a substantial axial preload by a retaining means which accomodates a substantial stack-up tolerance variation.

Another object of my invention is to provide a unitized wheel bearing assembly in which a bearing inner ring is retained on a wheel hub-outer drive member by a retaining means which has a substantial area of contact for the transmission of axial force to the bearing inner ring and which requires only a radial deformation force.

Other objects and features of the invention will become apparent to those skilled in the art as the disclosure is made in the following detailed description of a preferred embodiment of the invention as ilustrated in the accompanying sheet of drawings in which.

Figure 1:
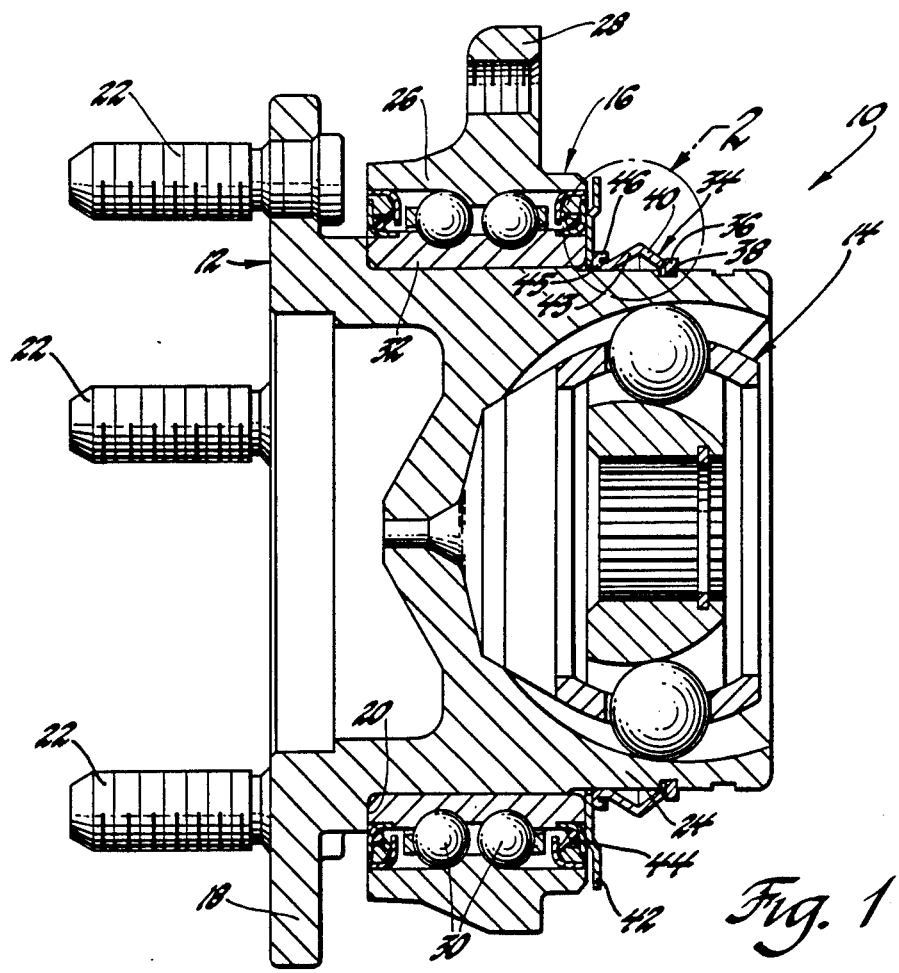
FIG. 1 is a longitudinal section of a wheel bearing assembly in accordance with a first embodiment of my invention.
Figure 2:
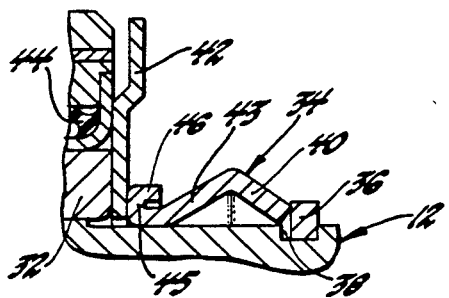
FIG. 2 is an enlargement of the portion of the wheel bearing assembly which is within the dash line circle 2 of FIG. 1.

Referring now to the drawing, FIG. 1 shows a wheel bearing assembly 10 for a motor vehicle which comprises a wheel hub 12; a universal joint 14 by means of which drive is transmitted to the wheel hub 12; and a bearing assembly 16 by means of which the wheel hub 12 is rotatably supported by the vehicle.

The wheel hub 12 has a flange 18 and an annular shoulder 20 at one end. The flange 18 carries several studs 22 for attaching the vehicle wheel (not shown). The wheel hub 12 has a tubular part 24 at the other end which is shaped to provide the outer drive member of the universal joint 14.

The universal joint 14 which is illustrated is the well known Rzeppa constant velocity universal joint and need not be described in detail. Other well known constant velocity universal joints can also be used as long as the outer drive member can be made as an integral part of the wheel hub 12.

The bearing assembly 16 comprises an outer bearing ring 26 which has a flange 28 for mounting the wheel bearing assembly 10 to a vehicle support (not shown), two rows of balls 30, and an inner bearing ring 32 which is mounted on the wheel hub 12 against the shoulder 20 preferably with a light press fit.

The inner bearing ring 32 is retained on the wheel hub 12 against the annular shoulder 20 under an axial preload by retaining means 34 which comprise a split retaining ring 36 which is seated in an annular groove 38 of the wheel hub 12 and a load ring 40.

The load ring 40 encircles the wheel hub 12 between the retaining ring 36 and the bearing inner ring 32. This particular wheel bearing assembly 10 which is illustrated includes a sheet metal shield 42 to protect the inboard bearing seal 44. However, such a shield is not necessary to practice the invention and the load ring 40 may act directly on the end face of the bearing inner ring 32.

The load ring 40 is formed of steel stock which is about 1.25 to 1.50 millimeters in thickness. It comprises a deformable band 43 of V-shaped cross section and a radial flange 45 at the end of the load ring 40 which is adjacent the bearing inner ring 32. The radial flange 45 increases the radial stiffness at the end of the load ring 40 which applies the axial preload and also the contact area for the transmitting axial preload force to the bearing inner ring 32. The radial stiffness at the flanged end of the load ring 40 is further increased by a circular rim 46 at the outer end of the radial flange 44.

Figure 3:
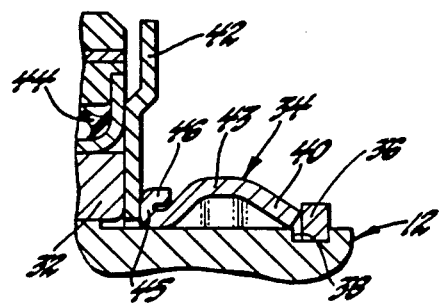
FIG. 3 is an enlargement similar to FIG. 2 showing the load ring after plastic deformation.

A substantial axial preload force is applied to the inner bearing ring 32 simply by plastically deforming the band 43 radially inwardly at its maximum diameter or apex as shown in FIG. 3 such as by a radial swaging die. In practice, the diameter at the apex can be reduced about 3 millimeters to produce an axial preload force from about 13,000 to 27,000 Newtons. Thus, a substantial axial preload can be achieved while a considerable stack-up tolerance can be accomodated.

Moreover, the flange 45 increases the contact area through which the axial preload force is transmitted avoiding the possibility of permanent deformation. Furthermore, the diameter at the flanged end of the load ring 40 which applies the axial preload force to the bearing inner ring 32 is maintained or increased slightly when the band 43 is permanently deformed because of the increased radial stiffness provided by the flange 45 and the rim 46. This assures that the preload force is properly applied to the end face of the inner bearing at the ring 32 outwardly of the chamfer at the ring bore.

Figure 4:
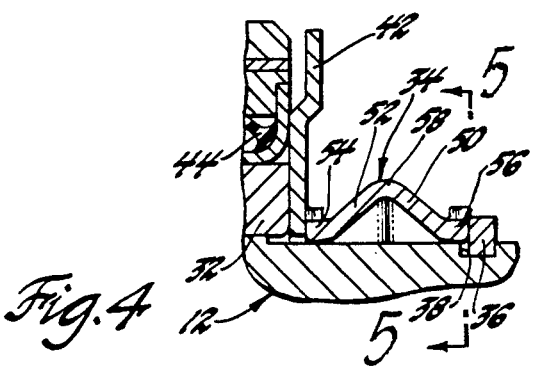
FIG. 4 is an enlargement similar to FIG. 3 showing a modified load ring.
Figure 5:
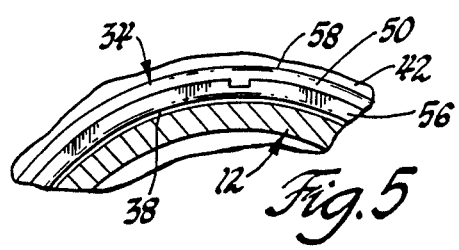

FIG. 4 shows a modified load ring 50 for field installation. The modified load ring 50 comprises a deformable band 52 of V-shaped cross section and a radial flange 54,56 at each end of the load ring 50. One or both of the flanges 54,56 may be notched to hold the load ring 50 circumferentially while the band 52 is plastically deformed radially inwardly by a rolling operation applied at the apex 58. The diameter at the apex 58 is reduced about the same amount, i.e. 3 mm to produce an axial preload force from about 13,000 to 27,000 Newtons. While the load rings 40 and 50 are shown as having deformable bands of V-shaped cross section, other concavo-convex cross sections, such as partspherical are possible.

The embodiments of the invention in which an exclusive property or privelege is claimed are defined as follows:

1. A wheel bearing assembly for a motor vehicle comprising;
    a wheel hub which has wheel mounting means and an annular shoulder at one end and a tubular part at the other end, which forms an outer drive member of a constant velocity universal joint by which drive is transmitted to the wheel hub,
    a bearing assembly having an outer ring which has means for securing the outer ring to a vehicle support and an inner ring which is mounted on the wheel hub against the annular shoulder; and
    means for retaining the inner ring on the wheel hub, said means comprising;
    a retaining ring having an inner margin disposed in an annular groove in the tubular part of the wheel hub and,
    a load ring encircling the wheel hub between the retaining ring and the inner ring of the bearing assembly,
    said load ring having a band of concavo-convex cross section which is plastically deformed radially inwardly so that the inner ring is biased against the annular shoulder under a substantial axial preload provided by the load ring,
    said load ring having a flange at the end of the load ring which is adjacent the inner ring of the bearing assembly to increase the radial stiffness so that said end at least maintains diameter when the concavo-convex band of the load ring is plastically deformed radially inwardly,
    the concavo-convex cross section of the band being V-shaped and the flange at the end of the load ring having a circular rim at its outer end which extends toward the other end of the load ring.

2. A wheel bearing assembly for a motor vehicle comprising;
    a wheel hub which has wheel mounting means and an annular shoulder at one end and a tubular part at the other end, which forms an outer drive member of a constant velocity universal joint by which drive is transmitted to the wheel hub,
    a bearing assembly having an outer ring which has means for securing the outer ring to a vehicle support and an inner ring which is mounted on the wheel hub against the annular shoulder; and
    means for retaining the inner ring on the wheel hub, said means comprising;
    a retaining ring having an inner margin disposed in an annular groove in the tubular part of the wheel hub and,
    a load ring encircling the wheel hub between the retaining ring and the inner ring of the bearing assembly,
    said load ring having a band of concavo-convex cross section which is plastically deformed radially inwardly so that the inner ring is biased against the annular shoulder under a substantial axial preload provided by the load ring,
    said load ring having a flange at the end of the load ring which is adjacent the inner ring of the bearing assembly to increase the radial stiffness so that said end at least maintains diameter when the concavo-convex band of the load ring is plastically deformed radially inwardly,
    the concavo-convex cross section of the band being V-shaped and, the load ring having a second flange at the other end, and at least one of the flanges being notched for holding the load ring circumferentially while the band is plastically deformed radially inwardly by a rolling operation.

* * * * *